United States Patent [19]

Sekine et al.

[11] 4,429,977
[45] Feb. 7, 1984

[54] EASY LOADING CAMERA

[75] Inventors: Jiro Sekine; Hiroshi Komatsuzaki; Hiroshi Hara; Nobuyuki Kameyama, all of Tokyo, Japan

[73] Assignee: Fuji Photo Film Co., Ltd., Kanagawa, Japan

[21] Appl. No.: 434,932

[22] Filed: Oct. 18, 1982

[30] Foreign Application Priority Data

Oct. 20, 1981 [JP] Japan .................................. 56-167560

[51] Int. Cl.³ ........................ G03B 17/22; G03B 17/28
[52] U.S. Cl. .................................... 354/203; 354/211; 354/212
[58] Field of Search ................ 354/288, 212–216, 354/202, 203, 211

[56] References Cited

U.S. PATENT DOCUMENTS 4,334,753  6/1982  Harvey ...................... 354/212 X Primary Examiner—John Gonzales
Attorney, Agent, or Firm—Pasquale A. Razzano

[57] ABSTRACT

In a photographic camera comprising a film magazine receiving chamber shaped to permit insertion of a film magazine having a film leader thereinto in one axial direction of the film magazine, and a film leader guiding means for guiding the film leader to extend in a proper direction when the magazine is inserted into the chamber, a tongue portion position limiting member is provided for positioning a narrow tongue portion formed in the leading end portion of the film. The tongue portion position limiting member is permitted to move to its operative position only when a magazine having a short film leader consisting substantially only of the tongue portion is inserted into the magazine receiving chamber.

6 Claims, 5 Drawing Figures

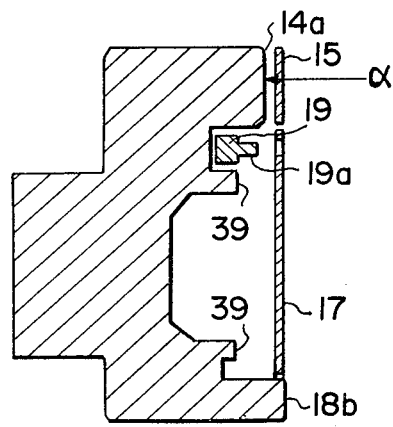
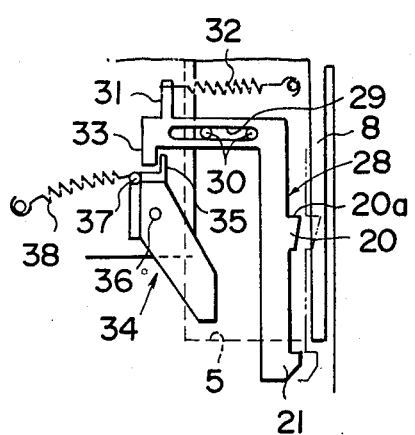
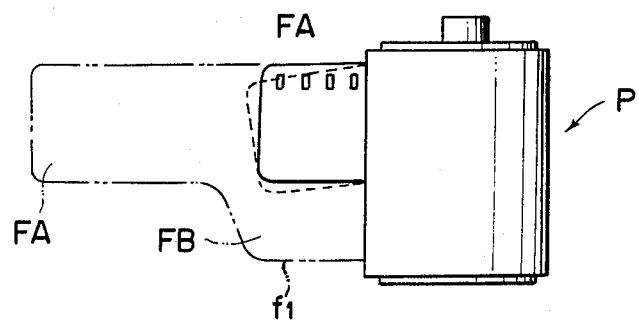

EASY LOADING CAMERA

BACKGROUND OF THE INVENTION

1. Field of the Invention

This invention relates to an easy loading camera, and more particularly to a 35 mm camera improved to facilitate loading of a film magazine.

2. Description of the Prior Art

Various attempts have been made to facilitate loading of the film magazine into a camera. For example, in Japanese Unexamined Patent Publication No. 55(1980)-186577 there is disclosed an easy loading camera in which a film magazine receiving chamber body is provided to be exposed outside the camera body when the back lid of the camera is opened and the film magazine is inserted into the film magazine receiving chamber by being axially moved through an opening formed in the bottom face of the chamber body. In this easy loading camera, the chamber body is arranged so that the film magazine can be inserted into the film magazine receiving chamber only in one direction and means is provided for guiding the film leader in order to assure that the film leader is automatically set in the correct position by simply inserting the magazine into the film receiving chamber and closing the back lid.

In the easy loading camera, the film leader is caused to extend along the film feeding path and take a position suitable for feeding of the film by the film leading guiding means. Once the film leader takes the proper position, the film leader can be automatically wound around the film take-up spool by a winding-up a winding-up operation conducted by a known film feeding means which engages with the perforations of the film leader and a known automatic film winding mechansim.

However, the length of the film leader projecting outside the magazine body differs from manufacturer to manufacturer though it is generally such that its leading end does not reach the film take-up chamber when the magazine is received in the film magazine receiving chamber. Some magazine has a long film leader which is long enough to reach the film take-up chamber, and some magazine have a short film leader which comprises only a narrow tongue portion formed in the leading end portion of the film by cutting away a part thereof. In the latter case, the film leader is apt to be inclined with respect to the film feeding direction. When the film leader is inclined, the film feeding means cannot be correctly engaged with the perforations of the film leader. Therefore, it is required to correct the position of the film leader comprising only the narrow tongue portion.

SUMMARY OF THE INVENTION

The primary object of the present invention is to provide an easy loading camera in which even a film magazine having a film leader consisting substantially only of a narrow tongue portion formed in the leading end portion of the film can be easily loaded into the camera without any additional operation.

In accordance with the present invention, in a photographic camera comprising a film magazine receiving chamber shaped to permit insertion of a film magazine having a film leader thereinto in one axial direction of the film magazine, and a film leader guiding means for guiding the film leader to extend in a proper direction when the magazine is inserted into the chamber, a narrow tongue portion position limiting member is provided for positioning a tongue portion formed in the leading end portion of the film. The tongue portion position limiting member is permitted to move to its operative position only when a magazine having a short film leader consisting substantially only of the tongue portion is inserted into the magazine receiving chamber.

The tongue portion position limiting member does not prevent a long film leader from being positioned in the proper feeding position since it is permitted to move to the operative position only when a magazine having the short film leader is inserted into the magazine receiving chamber.

BRIEF DESCRIPTION OF THE DRAWINGS

FIG. 3 is a cross sectional view showing a part of the camera of FIG. 1, FIG. 4 is a cross sectional view showing another part of the camera of FIG. 1, and FIG. 5 is a side view showing a known film magazine.

DESCRIPTION OF THE PREFERRED EMBODIMENT

Figure 1:
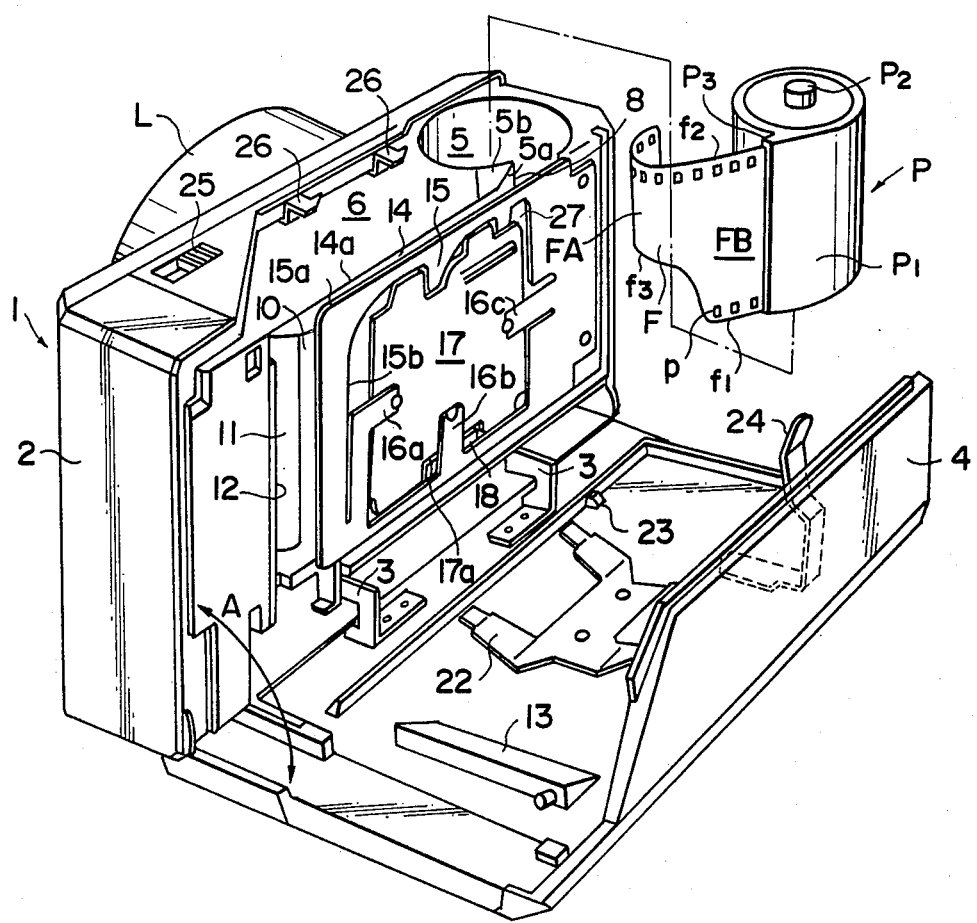
FIG. 1 is a perspective view of an easy loading camera in accordance with an embodiment of the present invention in the inverted position with the back lid thereof opened.
Figure 2:
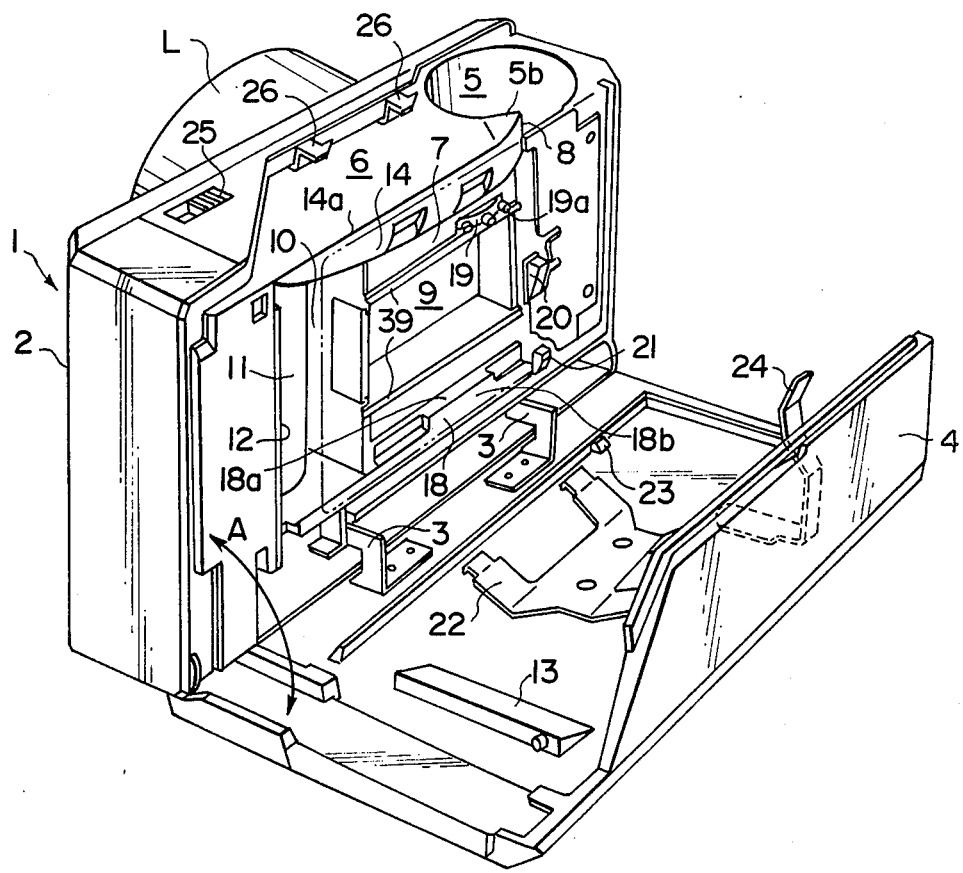
FIG. 2 is a view similar to FIG. 1 but partly broken away.

In FIG. 1 an easy loading camera 1 in accordance with an embodiment of the present invention is shown in the inverted position and a known 35 mm film magazine is indicated at P. The magazine P comprises a cylindrical body P1, film spool P2 and a tongue-like portion P3 which projects from the body P1 in a tangential direction thereof and through which the film exit slit is formed. Through the film exit slit, the film leader F of a predetermined length projects outside the body P1. Normally, the film leader F comprises a narrow tongue portion FA formed by cutting away a part of the leading end portion of the film, and a part FB of the full width portion which is drawn out from the magazine P by a predetermined length as shown by the chained line in FIG. 5, though the overall length of the film leader F projecting outside the magazine body P1 differs from manufacturer to manufacturer. However, some film magazines have a film leader consisting only of the narrow tongue portion FA as shown by the solid line in FIG. 5. In other words, there are some magazines in which only the narrow tongue portion is drawn out from the magazine body P1 as the film leader F. Such a film leader is apt to be inclined with repeet to the film feeding direction away from the position suitable for feeding of the film as shown by the broken line. This invention is directed to make provision for such film magazines so that even the film magazine having the film leader consisting only of the narrow tongue portion can be easily loaded into the camera without any additional operation. The photographic length projects outside the body P1. The photographic camera 1 of this embodiment comprises a taking lens L, a camera body 2 provided with a known internal mechanism, and a back lid 4 mounted on the camera body 2 by a hinge 3 near its upper surface so as to be swingable in the directions of the arrow A. On the right side (as seen in FIG. 1) of the camera body 2, there is provided a film magazine receiving chamber 5 formed as a substantially cylindrical space opening toward the bottom face 6 of the camera body 2. The magazine receiving chamber 5 opens at a portion of its side wall to form a slit 8 directed toward a film feeding path formed between a pressure plate 17 and a film aperture 9 formed in the rear face 7 of the body 2 (see FIG. 2). On the side of the aperture 9 opposite to the magazine receiving chamber 5 is formed a film take-up chamber 10. In the film take-up chamber 10 is mounted a film take-up spool 11 provided with an automatic film winding mechanism (not shown) which may be of known type. A fixed cutting blade 12 is mounted behind the film take-up chamber 10. The fixed blade 12 extends over the entire length of the film take-up chamber 10 and cooperates with a movable cutting blade 13 mounted on the back lid 4 to cut the leading end portion of the film leader F extending beyond the fixed blade 12 when the back lid 4 is closed. The portion of the rear face 7 of the body 2 near the bottom face 6 forms an inner guide member 14 chamfered at the lower and upper edges thereof as clearly shown in FIG. 3. An outer guide member 15 extends substantially in parallel to the inner guide member 14 slightly spaced therefrom and extends beyond the film aperture 9. The end face 15a of the outer guide member 15 adjacent to the bottom face 6 of the body 2 is substantially flush with the edge 14a of the inner guide member 14 adjacent to the bottom face 6. The outer guide member 15 has a central opening 15b, and the pressure plate 17 is held therein supported on resilient arms 16a, 16b and 16c which are integral with the outer guide member 15. The pressure plate 17 is provided with a recess 17a at the central portion of the lower (as seen in FIG. 1) edge thereof. A protrusion 18 is formed on the rear face 7 of the body 2 below (as seen in FIG. 1) the film aperture 9 and is received in the recess 17a of the pressure plate 17. On the right side of the body 2 above the film aperture 9 (as seen in FIG. 2) is disposed a film feeding device 19 having engaging pins 19a which are brought into engagement with the perforations of the film. A tongue portion upper edge limiting member 20 is provided on the rear face 7 at about the center of the body 2 in the direction of its height near the magazine receiving chamber 5. A releasing member 21 projects toward the outer guide member 15 below the tongue portion upper edge limiting member 20 (as seen in FIG. 2). Functions of these components will be described in detail hereinbelow.

On the inner surface of the back lid 4 are disposed a pressure plate pushing member 22 formed of a resilient material such as spring steel and a projection 23, which are arranged so as to abut against the pressure plate 17 and the releasing member 21, respectively, when the back lid 4 is closed. The back lid 4 is further provided near the bottom side thereof with a film leader lower edge limiting member 24 in the form of an arm made of a rigid material. The back lid 4 is arranged to be held in the closed position by engagement between a latch member 26 disposed on the bottom face 6 of the camera body 2 and an engaging member (not shown) provided on the back lid 4. The engagement of the latch member 26 and the engaging member can be released by sliding a slide button 25 mounted on the bottom face 6.

Said slit 8 of the magazine receiving chamber 5 communicates with the space between the inner and outer guide members 14 and 15, i.e. the film feeding path, and extends in a tangential direction to the cylindrical chamber 5. A portion 5b of the wall of the chamber 5 defining the inner edge of the slit 8 projects like a peninsula. Therefore, the magazine P can be inserted into the chamber 5 only in a position in which the recess behind the tongue-like portion P3 engages with the peninsula-like portion 5b. The direction of the insertion of the magazine into the magazine receiving chamber 5 is thus limited and the magazine P is held in place by the engagement of the recess and the peninsula-like portion 5b. The inner guide member 14 extends from the peninsula-like portion 5b toward the film take-up chamber 10 in parallel to the focal plane of the lens L and forms the film feeding path between itself and the outer guide member 15. When the magazine P is inserted into the magazine receiving chamber 5, the peninsula-like portion 5b pushes the film leader F away from the body P1 to extend in the direction of the inner guide member 14 and the lower edge (as seen in FIG. 2) of the film leader F abuts against the edge 14a of the inner guide member 14 to be stretched therealong and thus inserted into the film feeding path between the inner and outer guide members 14 and 15. Thus, even if the film leader F is curled around the body P1, the magazine P can easily be loaded in the camera by simply inserting the magazine P into the magazine receiving chamber 5. The bottom face 6 of the camera body 2 is elevated in height toward the extremity of the peninsula-like portion 5b, and the edge 14a of the inner guide member 14 merging into the surface 5a of the peninsula-like portion 5 facing the slit 8 extends substantially horizontally or extends to slope down toward the left as seen in FIG. 2. Therefore, the film leader F can be smoothly stretched along the surface 5a and the edge 14a. Further, since the edge 14a of the inner guide member 14 is chamfered and rounded as shown in FIG. 3, there is no possibility of the upper edge f1 (in FIGS. 1 and 2, the camera body and the magazine are shown inverted) of the film leader F or the perforations p coming opposite to the edge 14a to interfere with the insertion of the leader F into the film feeding path. The other edge 14b of the inner guide member 14 is also chamfered and rounded in order to prevent the edge 14b from snagging the lower edge f2 or the perforations p when the magazine P is taken out from the camera. The engaging pins 19a of the film feeding device 19 are also chamfered in a similar manner to prevent them from snagging the film leader F. Preferably, all the edges having the possibility of coming in contact with the film leader F when the magazine P is loaded or taken out are chamfered. The chamfered surfaces need not necessarily be rounded and may be planar.

The film feeding device 19 is positioned so that the engaging pins 19a are retracted inwardly from the outer surface of the inner guide member 14 (the plane indicated at α in FIG. 3). Therefore, the engaging pins 19a do not engage with the perforations p, upper edge f1 or the lower edge f2 of the film leader F when the magazine P is inserted into the chamber 5 or taken out therefrom.

The pressure plate 17 mounted in the central opening 15b of the outer guide member 15 is positioned so that its inner surface is flush with the inner surface of the outer guide member 15. Therefore, the film leader F is free from interference on the outer guide member side.

The lower surface (upper surface as seen in FIGS. 1 and 2) 18a of the protrusion 18 received in the recess 17a of the pressure plate 17 is disposed to abut against the upper edge f1 of the film leader F, thereby keeping the film leader F in the proper feeding position. Accordingly, even if the film leader F is drawn out from the film exit slit in the tongue-like portion p3 inclined downwardly (as reviewed in FIGS. 1 and 2) with respect thereto, the film leader F cannot project beyond the surface 18a of the protrusion 18. The protrusion 18 has sufficient height to assure that the free end surface 18b thereof is positioned flush with the outer surface of the pressure plate 17 or outside the outer surface of the pressure plate 17 in order to prevent the film leader F from passing between itself and the pressure plate 17. Therefore, when the film leader F is inclined with respect to the body P1, the upper edge f1 thereof is pushed by the lower surface 18a of the protrusion 18 so that the film leader F takes the proper position. As can be seen from the above description, the protrusion 18 serves to limit the position of the upper edge f1 of the film leader F. The position of the upper edge f1 of the film leader F may be limited by other means than the protrusion 18, for example, by a plurality of pins projecting from the rear face 7 of the camera body 2.

After the magazine P is thus inserted into the magazine receiving chamber 5 with the film leader F extending along the film feeding path, the back lid 4 is closed. As described above, the length of the film leader F projecting outside the body P1 of the magazine P is generally such that the leading end of the leader F is wholly retained between the inner and outer guide members 14 and 15 when the magazine P is inserted into the magazine receiving chamber 5. In this case, when the film is fed in a manner to be described hereinafter, the leading end of the film leader F enters the film take-up chamber 10 by virtue of its curling characteristics to be wound around the film take-up spool 11 by the automatic winding mechanism. On the other hand, if the leader F projecting outside the body P1 is long enough to extend beyond the film take-up chamber 10, the leading end portion of the film leader F extending beyond the chamber 10 is cut by the fixed blade 12 and the movable blade 13 when the back lid 4 is closed. Then the film leader F can be automatically wound around the film take-up spool 11.

As described above, when the film leader F is inclined downward as viewed in FIG. 1 with respect to the film exit slit, the protrusion 18 pushes the upper edge f1 of the film leader to correct its position to the proper feeding position. On the other hand, when the film leader F is inclined upward as viewed in FIG. 1 with respect to the film exit slit, said film leader lower edge limiting member 24 pushes the lower edge f2 of the film leader F downward as seen in FIG. 1 to correct the position of the leader F. The film leader lower edge limiting member 24 is mounted on the back lid 4 and abuts against the lower edge f2 of the leader F when the back lid 4 is closed through a space 27 formed between the periphery of the pressure plate 17 and the inner peripheral edge of the outer guide member 15 defining the central opening 15b. The film leader lower edge limiting member 24 is positioned to abut against the lower edge f2 of the leader F near the tongue-like portion P3 of the magazine P so as not to buckle the leader F. Being in the form of a long arm, the film leader lower edge limiting member 24 can obtain access to the film leader F before the leader F is held by the pressure plate 17 or sandwiched between the fixed and movable blades 12 and 13, i.e., while the leader F is still freely movable, whereby the leader F can easily be moved into the proper position.

In the case of a film magazine in which only the narrow tongue portion FA projects outside the body P1, the upper edge f1 of the leader F cannot reach the protrusion 18, and accordingly the position of film leader F cannot be corrected when the film leader F is inclined downwardly as viewed in FIG. 1. Said tongue portion upper edge limiting member 20 is provided for correcting the position of such a short film leader inclined downwardly as reviewed in FIG. 1. FIG. 4 shows the tongue portion upper edge limiting member 20 and the mechanism associated therewith. The tongue portion upper edge limiting member 20 and the releasing member 21 are provided on a single L-shaped movable lever 28. The movable lever 28 is supported by a pair of pins 30 which are slidably received in an elongated opening 29 formed in the lever 28 to extend in a direction substantially perpendicular to the rear face 7 of the camera body 2. The movable lever 28 is urged toward the rear face 7 by means of a tension spring 32 fixed to a projection 31 formed thereon. The movable lever 28 is further provided with downwardly directed shoulder 33 having a rearwardly facing abutting surface which is adapted to be engaged with an abutting portion 35 of a position detecting member 34 for detecting the position of the magazine P. The position detecting member 34 is pivotably supported on a pivot pin 36 and is urged in the counterclockwise direction by a spring 38 fixed to a pin 37 on the position detecting member 34. The urging force of the spring 38 is stronger than that of the spring 32, and accordingly the movable lever 28 cannot move rearwardly (rightwardly as seen in FIG. 4) when the abutting portion 35 of the position detecting member 34 abuts against the shoulder 33 thereof. The lower end portion of the detecting member 34 obliquely projects into the magazine receiving chamber 5. When the magazine P is inserted into the receiving chamber 5 the lower end portion of the position detecting member 34 is pushed by the lower end (as seen in FIG. 4) of the magazine P, whereby the position detecting member 34 is pivoted in the clockwise direction overcoming the urging force of the spring 38. The movable lever 28 is thus permitted to move rightwardly under the force of the spring 32, whereby the tongue portion upper edge limiting member 20 on the lever 28 projects into the space between the rear face 7 and the outer guide member 15 as shown by the chained line in FIG. 4. The tongue portion upper edge limiting member 20 is positioned so that the upper edge f3 (FIG. 1) of the narrow tongue portion FA of the film leader F lies on the upper surface 20a thereof when the film leader F is in the proper feeding position. If the short film leader F extending through the slit 8 is inclined downwardly as viewed in FIG. 4, the upper edge f3 of the leader F will abut against the upper surface 20a of the tongue portion upper edge limiting member 20, whereby the position of the leader F is corrected. When the back lid 4 is closed after the insertion of the magazine P into the magazine receiving chamber 5, the projection 23 on the inner surface of the back lid 4 pushes the releasing member 21 leftwardly as seen in FIG. 4 overcoming the force of the spring 32, whereby the movable lever 28 moves leftwardly to retract the tongue portion upper edge limiting member 20 from the space between the outer guide member 15 and the rear face 7 of the camera body 2. Accordingly, the film can be fed freely without being interfered with by the tongue portion upper edge limiting member 20 after the closure of the back lid 4.

As shown in FIG. 4, the position detecting member 34 is disposed to be brought into contact with the lower end of the magazine P at a level slightly lower than the level of the upper surface 20a of the tongue portion upper edge limiting member 20. Accordingly, in the case of magazines having a film leader of the regular length or a longer film leader, the upper edge f1 of the film leader F passes the upper edge limiting member 20 before it is moved to project into the space between the rear face 7 and the outer guide member 15. Thus, the tongue portion upper edge limiting member 20 does not interfere with the loading of a magazine having a leader of the regular length or a larger length.

When the magazine P is inserted into the magazine receiving chamber 5 and the back lid 4 is closed, the film leader F of the magazine P automatically takes the proper feeding position. At the same time, the film leader F is pressed against a pair of rails 39 on the upper and lower sides of the film aperture 9 by the pressure plate 17 which is pushed toward the film aperture 9 by the pushing member 22 when the back lid 4 is closed. When the film leader F is pressed against the rails 39, the engaging pins 19a of the film feeding device 19 can engage with the perforations p of the leader F. Accordingly, when the film feeding device 19 is actuated by turning on the power switch of the camera or depressing the shutter button, the film leader F is fed toward the film take-up chamber 10. When the back lid 4 is opened, the pressure plate 17 is moved away from the film aperture under the resilient force of the resilient arms 16a to 16c to the original position in which its inner surface is flush with the inner surface of the outer guide member 15.

In the case of a magazine having a leader is long enough to project outside the camera body when the back lid is closed, the severed leading end portion of the film leader must be drawn out from the camera body without adversely affecting the light-tight shield between the camera body 2 and the back lid 4. This can be accomplished by shielding the portion at which the camera body and the back lid contact each other using a teremp light shielding polyurethane foam or labyrinth seal (See Japanese Patent Publication No. 44(1979)-23785).

In the above embodiment, the back lid is mounted for swinging movement about an axis extending along the upper lateral edge of the camera body. However, this is not essential and the back lid may be mounted for swinging movement about a vertical axis on the camera body.

In order to protect the internal mechanism within the camera body from dust and the like, it is preferred that the opening angle of the back lid be limited. For example, this can be accomplished by swingably mounting the movable cutting blade on the camera body at one end, and connecting the other end thereof to the back lid in a manner which limits the angle of the swinging movement of the movable cutting blade, thereby limiting the opening angle of the back lid.

We claim:

1. A photographic camera comprising a film magazine receiving chamber shaped to permit insertion of a film magazine having a film leader thereinto in one axial direction of the film magazine, and a film leader guiding means for guiding the film leader to extend in a proper direction when the magazine is inserted into the chamber characterized by having a tongue portion position limiting means for limiting the position of a narrow tongue portion formed in the leading end portion of the film, the tongue portion position limiting means comprising a tongue portion position limiting member which is movable between a retracted position in which it is retracted from the feeding path of the film and an operative position in which it projects into the feeding path to limit the position of the narrow tongue portion, and a control means which permits the tongue portion position limiting member to move to the operative position only when a film magazine from which only the narrow tongue portion projects as the film leader is inserted into the film magazine receiving chamber, said tongue portion position limiting member being adapted to be moved to the retracted position when the back lid of the camera is closed.

2. A photographic camera as defined in claim 1 in which said control means comprises a magazine position detecting member which is projected into said magazine receiving chamber and operatively connected with said tongue portion position limiting member so that when the magazine is inserted into the chamber and the magazine position detecting member is brought into contact with the magazine, the tongue portion position limiting member is permitted to move to the operative position, the position of the magazine position detecting member being selected so that when the magazine inserted into the magazine receiving chamber has a relatively long film leader consisting of the narrow tongue portion and the full width portion, the magazine position detecting member is not brought into contact with the magazine until the edge of the full width portion of the film leader passes the tongue portion position limiting member, whereby the tongue portion position limiting member is prevented from moving to the operative position by the surface of the film leader when the magazine having the long film leader is inserted into the magazine receiving chamber.

3. A photographic camera as defined in claim 2 in which said tongue portion position limiting member limits the position of the longitudinal side edge of the narrow tongue portion which is directed toward the direction of the insertion of the magazine into the chamber.

4. A photographic camera as defined in claim 2 further comprising a film leader position limiting means which, when a magazine having said relatively long film leader is inserted into the chamber, is engaged with the full width portion of the film leader to position it in a position suitable for feeding of the film.

5. A photographic camera as defined in claim 2, 3 or 4 further comprising a cutting means for cutting the leading end of the film leader when the leading end portion of the film leader extends beyond the film take-up spool.

6. A photographic camera as defined in claim 5 in which said cutting means is operated in response to the closure of the back lid.

* * * * *